Dec. 11, 1923. 1,477,079
L. ROUANET
DETACHABLE WHEEL
Filed Dec. 10, 1919
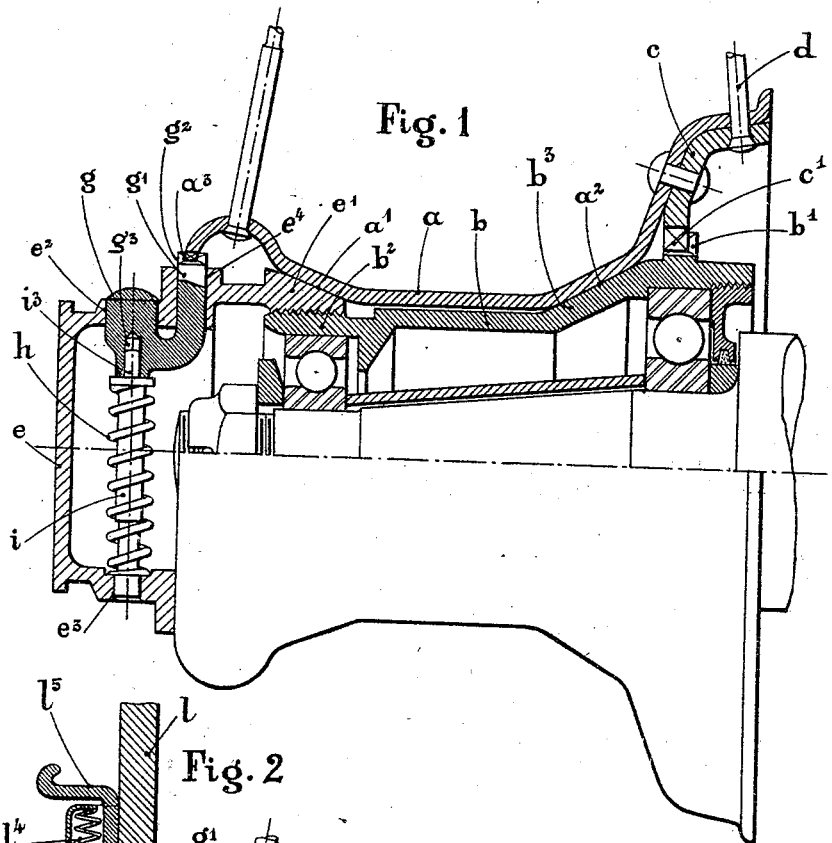
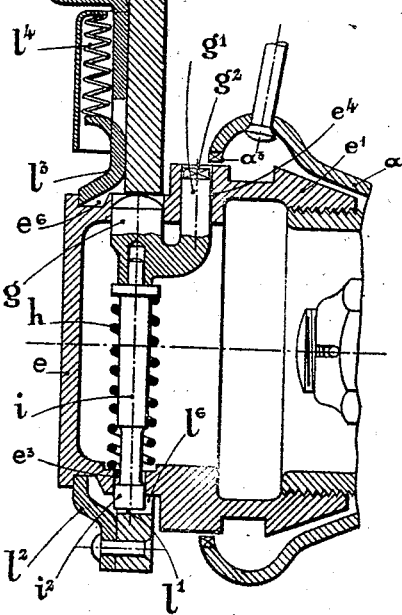
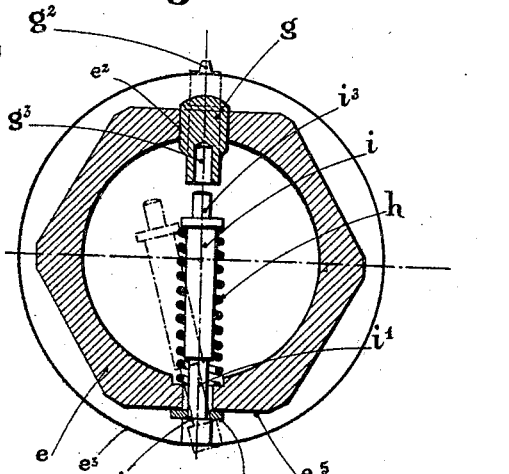

Patented Dec. 11, 1923.

1,477,079

UNITED STATES PATENT OFFICE.

LOUIS ROUANET, OF IVRY PORT, FRANCE, ASSIGNOR TO COMPAGNIE D'APPLICATIONS MECANIQUES, OF IVRY PORT, SEINE, FRANCE.

DETACHABLE WHEEL.

Application filed December 10, 1919. Serial No. 343,755.

*To all whom it may concern:*

Be it known that I, LOUIS ROUANET, citizen of the Republic of France, residing at 42 Rue Franklin, Ivry Port, Seine, in the Republic of France, have invented new and useful Improvements in Detachable Wheels, of which the following is a specification.

This invention relates to detachable wheels and concerns locking means therefor, which are visible from the outside of the vehicle.

It consists in the use of a drum or hub stamped or hammered directly from a sheet of metal of uniform thickness, the said drum not presenting, when finished, any superthickness in its different surfaces and requiring no working of the inner periphery. The latter present two cones, one of which is centred on a corresponding tapering portion of a false hub and the other constitutes a supporting surface for a corresponding cone provided on the tightening nut. The said drum which is stamped in a sheet of metal of minimum thickness receives at a suitable spot a strengthening plate on which is provided the driving device. This plate can be secured to the drum by means of rivets or directly by means of the wheel spokes.

It also consists in the arrangement of the locking means which is of extreme simplicity whilst assuring reliable locking which can be readily seen.

It further consists in the provision of a wrench for operating the tightening nut of the said wheel, and in the method of dismounting the locking device which permits of quickly replacing any part thereof in case of damage.

It will be more clearly understood by referring to the annexed drawing which is only given, of course, by way of example and in which:

Fig. 1 is a view in section of a front hub of detachable wheel constructed according to the invention.

Fig. 2 represents in section the front part of the hub during the loosening operation.

Fig. 3 is a view in cross section showing the manner of removing the nut and lock.

The drum $a$ is beaten or stamped out of a sheet of metal of uniform thickness, it has no superthickness, no turned part, nor driving teeth or keying.

The driving of the false hub $b$ by the drum or hub $a$ is ensured by the addition to the said drum of a crown-wheel $c$ on which is provided a number of teeth $c'$ which engage in corresponding teeth $b'$ of the false hub $b$. The crown-wheel $c$ is fastened on the drum $a$ by means of rivets, bolts or screws, the number of the latter may be reduced, but in this case the crown-wheel $c$ carries together with the drum $a$ the wheel spokes $d$; this latter construction is preferable as it greatly increases the cohesion between the crown-wheel $c$ and the drum $a$.

The tightening of the hub $a$ on the false hub $b$ is secured by means of a nut $e$ inside which the locking means are disposed; the said nut $e$ is provided at its inner portion with a tapering end $a'$ internally screw-threaded so that it can be screwed on a corresponding threaded part $b^2$ cut at the outer end of the false hub $b$. The tapering part $c'$ of the nut $e$ abuts against a corresponding cone $a'$ of the drum $a$ and tightens and centres the latter by means of another part $a^2$ tapered in the opposite direction, on a corresponding cone $b^3$ provided on the inner part of the false-hub $b$.

The drum $a$ has on its inner periphery of its outer edge and over its whole circumference a number of locking teeth $a^3$ in which can be engaged a tooth or a small toothed quadrant carried by the locking device of the tightening nut.

The tightening nut $e$ is bored diametrically as at $e^2$ and $e^3$. In the hole $e^2$ slides a round-headed bolt $g$, which has an arm $g'$ situated in the same plane and which can also slide in a corresponding hole $e^4$ of the nut $e$. The bolt $g$ is pushed outwards by a spring $h$ guided on a rod $i$ which with its end $i^3$ engages in a blind hole $g^3$ of the bolt $g$, the branch $g'$ of the bolt $g$ has at its outer end a tooth or toothed quadrant $g^2$ which engages, under the pressure of the spring $h$, between the teeth $a^3$ of the drum $a$.

The size of the bolt $g$ is such that it passes beyond the surface of the nut when the tooth $g^2$ is in engagement with the teeth $a^3$. The spring $h$ is of sufficient strength for the locking to be effected in a positive manner; loosening of the nut when it is fully screwed up therefore becomes impossible.

The advantage of this arrangement is that it allows the use of a very simple false hub, the locking means being entirely borne by the tightening nut.

The spanner or wrench employed for the operations of tightening and loosening the drum on the false hub is so devised that when it is fitted on the nut $e$ it automatically pushes back the bolt $g$, thus disengaging the tooth $g^2$ from the teeth $a^3$. When the sets of teeth are not in engagement the manipulation is permitted.

The locking device carried by the nut $c$ is very simple, and the parts thereof are so arranged that they cannot become disengaged from one another nor detached from the nut.

For removing the locking device mounted within the nut $e$, one may proceed as follows:

By means of any tappet or plunger the bolt $g$ is pushed (Fig. 3) until the edge $i^2$ passes beyond the surface $e^5$ of the nut $e$ to a sufficient extent to allow of engaging a small flat fork $u$ which maintains in the obtained position the guiding rod $i$ of the spring in spite of the tension of the latter. The rod $i$ has a narrowing $i'$ of suitable length; the said narrowing having a less diameter than the hole $e^3$ allows the rod $i$ to be inclined until the bolt $g$ through the interior of the nut can be disengaged. There is then nothing further to do than let the rod $i$ freely resume its position, to withdraw the fork $u$ and the said rod $i$ can be easily withdrawn through the hole $e^2$ of the nut $e$. The fixing of the locking device inside the nut is effected inversely in a similar manner.

The locking device above described presents as an advantage its visibility from outside and further allows in case of shocks or deteriorations the bolt $g$ to be easily disengaged from the teeth of the drum by means of a tool or punch, in order to effect the replacement of the deteriorated member.

The spanner $l$ can be obtained by stamping or any other suitable process; it comprises a cut-out part $l^1$ corresponding to the shape of the sides of the tightening nut $e$, and fingers $l^2$ and $l^3$, the latter being subjected to the action of a spring $l^4$ which tends to press it constantly into the bottom of a groove $e^6$ of the nut $e$. A small tongue-piece $l^5$ suitably curved enables the spanner to be disengaged from the tightening nut. The said spanner $l$ also has notches $l^6$ for the purpose of receiving the end of the rod $i$ when the bolt $g$ is pushed back inside the nut by the spanner.

Having now described my invention, what I claim as new and desire to secure by Letters Patent is:

1. A detachable wheel construction comprising in combination a false hub, a wheel hub, a nut screwed upon the false hub and adapted to securely hold the wheel hub on the false hub, locking teeth provided on the wheel hub, a spring controlled rod carried in the nut and a locking bolt detachably mounted on said rod and adapted to engage into said locking teeth, the locking bolt being adapted to protrude in its operative position through the wall of the nut and the rod being so mounted in the nut that it may be swung out of the way of the locking bolt.

2. A detachable wheel construction comprising in combination a false hub, a wheel hub, a nut screwed upon the false hub and adapted to securely hold the wheel hub on the false hub, locking teeth provided on the wheel hub, a spring controlled rod carried in the nut and a locking bolt detachably mounted on said rod and adapted to engage into said locking teeth, the locking bolt being adapted to protrude in its operative position through the wall of the nut and the rod being so mounted in the nut that it may swung out of the way of the locking bolt, the rod being provided with means whereby it may be maintained in its disengaged position.

In testimony whereof I have signed my name to this specification.

LOUIS ROUANET.